United States Patent
Fouineteau

[11] 3,885,321
[45] May 27, 1975

[54] DOMESTIC APPLIANCE FOR DRYING VEGETABLES

[76] Inventor: Gilberte Fouineteau, Avenue Francois Devosge, 70100-Gray, France

[22] Filed: Oct. 25, 1973

[21] Appl. No.: 409,457

[52] U.S. Cl................................ 34/58; 210/360 R
[51] Int. Cl............................................ F26b 17/24
[58] Field of Search ......... 34/8, 58, 78; 210/360 R; 99/479, 410, 355; 68/23; 134/135

[56] References Cited
UNITED STATES PATENTS

| | | | |
|---|---|---|---|
| 1,000,491 | 8/1911 | Busby et al. | 210/360 R |
| 1,356,250 | 10/1920 | Williamson | 210/360 R |
| 2,138,334 | 11/1938 | Becquet | 210/360 R |
| 3,200,737 | 8/1965 | Ferenc | 99/355 |
| 3,753,297 | 8/1973 | Mantelet | 34/58 |

FOREIGN PATENTS OR APPLICATIONS
742,028   2/1933   France ........................... 210/360 R Primary Examiner—Kenneth W. Sprague
Assistant Examiner—James C. Yeung
Attorney, Agent, or Firm—Cushman, Darby & Cushman

[57] ABSTRACT

A domestic appliance for drying vegetables comprises a basket rotatable in an open-topped container which can be closed by a cover from the underside of which there is suspended a rotatable element capable of rotation by a crank and a set of gears carried by the cover. A peripheral rim of the rotatable element and the upper edge of the basket form complementary coupling means whereby the basket is rotatable in the container on turning of the crank.

11 Claims, 2 Drawing Figures

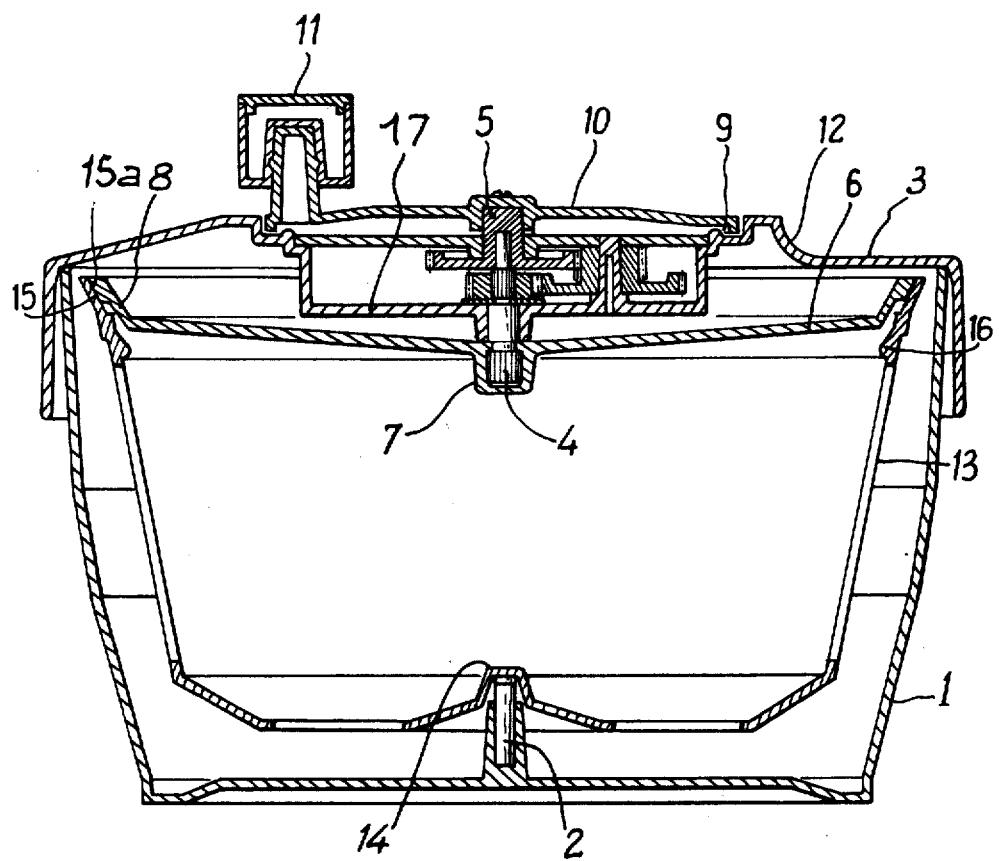

DOMESTIC APPLIANCE FOR DRYING VEGETABLES

BACKGROUND OF THE INVENTION

1. Field of the Invention

This invention relates to an appliance for domestic use which can be utilised, among other uses, for the draining of vegetables and salads under the action of centrifugal force.

2. Description of the Prior Art

Numerous appliances are already known which are designed for draining vegetables and salads. With the majority of such appliances, the water eliminated is thrown out of the appliance during its use, as a result of which the appliance has to be used in a vat or in a deep basin.

A salad drainer is also known which has an outer container with solid walls and an inner removable basket with perforated walls. But, in this drainer, as in the majority of others already known, without an external container with a solid bottom, the basket has a central shaft which rises to its upper opening and which is detrimental to the convenience of use of the basket.

In other known appliances, the internal basket has an internal volume quite free of any obstructions, but the basket is not independent, and cannot be extracted from an external casing which surrounds it. It is impossible to place the basket on its bottom and to use it alone with its opening turned upwards.

SUMMARY

It is an object of the invention to supply a domestic appliance which may be used for the draining of salads, having a removable basket usable independently with an inner volume that is completely free.

According to the invention there is provided a domestic appliance for drying vegetables comprising a container having a solid bottom and a solid side wall, a vertical pivot placed at the centre of the bottom, a removable cover for closing the container, a rotatable crank mounted on the cover and associated with a set of speed gears carried by the cover, coupling means arranged to impart a couple of rotations, said means being connected to the gears and suspended inside the cover, a removable basket which has a bottom provided with a recess to receive said pivot and a perforated side wall terminating in an upper edge, said upper edge of the side wall of the basket providing, during rotation, a coupling means complementary to the coupling means suspended in the cover, said two coupling means fitting one with the other when the cover is placed on the container.

BRIEF DESCRIPTION OF THE DRAWINGS

FIG. 2 is a cross-sectional view through a plane passing through the axis of the appliance in FIG. 1.

DESCRIPTION OF THE PREFERRED EMBODIMENT

Figure 1:
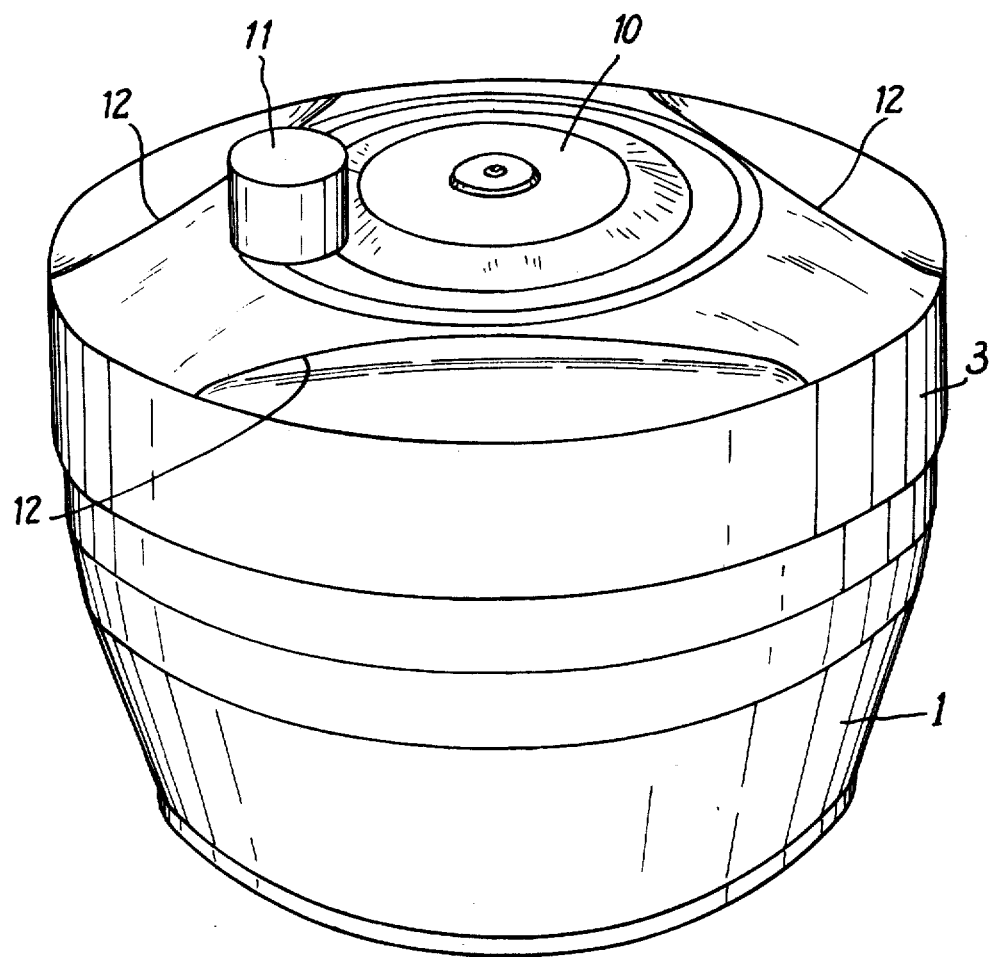
FIG. 1 is a general perspective view of an appliance according to the invention.

Referring to the drawings, the appliance comprises an outer container 1 having a solid bottom and a solid side wall. A pivot 2 of relatively low height, is mounted vertically at the centre of the bottom, in a suitable housing.

A cover 3 is used to close the container 1 in the manner of a hood. This cover has, inside an enclosed casing, a set of step-up speed gears, known per se, with two trains of pinions, and a central shaft. One end 4 of which projects downwards and the other end 5 of which projects upwards, in relation to the cover, at the centre of the latter.

A member 6 which, in this example, is a solid disc, is fixed to the end 4 of the shaft so as to rotate therewith. The member 6 comprises a core, or hub, 7 and a peripheral tyre 8. The two parts 7 and 8 may, if desired, be joined together by a plurality of radially extending arms instead of being parts of a solid disc. The disc 6 which is suspended inside the cover 3 forms a coupling means capable of transmitting a couple of rotations; it can if desired be replaced by other equivalent means.

The upwardly directed end 5 of the central shaft protrudes from the middle of a circular depression 9 in which a disc 10 is arranged, at least in part. The disc 10 is fixed to the end 5 of the shaft so as to rotate therewith and forms with a handle or knob 11 carried near its edge a crank for rotating the disc 6.

The top surface of the cover 3 has, outside the depression 9, several areas each of which is limited by a step 12 which makes it possible to immobilise the appliance using one hand only.

Inside the container 1 it is possible to place the basket 13 which has a bottom with a not very pronounced central recess 14 acting as a housing for the upper end portion of the pivot 2.

The bottom of the basket 13 is perforated, as is also the side wall.

The upper edge of the basket 13 and the peripheral tyre 8 of the rotatable member or disc 6 are intended to co-operate together. To this end the upper edge of the basket 13 is provided with a rotating coupling means complementary to the coupling means provided on the tyre 8 of disc 6 which is suspended under the cover 3.

In the drawing, the additional coupling means are constituted by male 15a and female 15 parts, in the shape of a truncated cone, which fit together. This result is achieved by giving to disc 6 and to basket 13 corresponding diameters and by placing the opening of the basket at a height such that the weight of the cover 3 effects a suitable coupling, sufficient to permit of the driving of the basket.

It is preferable to give to the inner disc 6 an upwardly turned concavity as may be seen in FIG. 2. Thus, a casing 17, located under the inner face of the cover 3, and which houses the set of gears, enters at least partly the concave volume of the disc 6 when the draining appliance is closed. This arrangement reduces advantageously the overall height of the appliance.

It will be observed that the basket 3 has an inner volume and an upper opening which are completely free from obstructions, such as radial arms and a column or central shaft.

Preferably, the internal face of the basket has, near the upper edge, a circular rib 16 which facilitates its gripping and its removal, with one hand only, out of the container 1.

Thus, the basket is easily removable and usable as such, for example as a strainer, outside the appliance. The flat bottom of the basket makes it convenient to use.

I claim:

1. A lightweight manually stabilized domestic appliance for drying vegetables comprising:
   a container having a solid bottom and a solid side wall,
   a vertical pivot placed at the center of the bottom,
   a cover for closing the container and completely manually removable readily therefrom by merely lifting off said cover,
   a manually operated rotatable crank mounted on the cover and disposed to circumscribe only part of the top of said cover when rotated to provide a non-crank interfering area in another part of the top of said cover for manually immobilizing said container during crank rotations,
   rotation coupling means connected to said crank and suspended horizontally inside the cover and removable therewith by said lifting,
   a removable vegetable basket which has a bottom provided with a recess to receive said pivot from which it is readily manually liftable when said cover is removed,
   said basket having a perforated side wall terminating in an upper edge,
   said upper edge of the side wall of the basket providing, during rotation, a second coupling means complementary to the said rotation coupling means suspended in the cover,
   said two coupling means fitting one with the other when the cover is placed on the container so that said basket is rotated when said crank is rotated and said container is held immobile.

2. An appliance according to claim 1, wherein the coupling means suspended in the cover is a disc the outer periphery of which is capable of being engaged with said upper edge of the basket.

3. An appliance according to claim 2, wherein the outer periphery of the disc has a truncated part and the upper edge of the basket has at its inner periphery a truncated part, said two truncated parts constituting said coupling means which fit together when the cover is placed on the container.

4. An appliance according to claim 1, wherein the crank sweeps a part only of the surface of the cover in a central zone thereof, and wherein the surface of the cover outside the surface swept by the crank has several areas each limited by a step and making it possible to immobilise the appliance during rotation with only one hand.

5. An appliance according to claim 4, including speed gears carried by the cover and having a central shaft which protrudes upwardly from the cover, and wherein the cover has a depressed central circular zone in which a disc placed and fixed to the central shaft is provided with a knob or handle and serves as a driving crank.

6. An appliance according to claim 2, wherein the disc suspended in the cover has a concave shape with its concavity turned towards the cover, and wherein the set of gears is enclosed in a casing fixed to the cover and the casing partially protrudes in the concavity of the disc.

7. An appliance according to claim 1, wherein the upper edge of the basket is provided with an inner rib to facilitate gripping of the basket.

8. A domestic appliance for drying vegetables comprising:
   a container having a bottom and a side wall, a vertical pivot disposed on said bottom interiorly of said container;
   a removable cover for closing said container, said container having an upper face;
   a crank carried by said cover rotatable over only a portion of said upper face, said upper face being provided with step means disposed outside of said portion;
   gear means connected to said crank and supported by said cover;
   first coupling means connected to said gear means and suspended within said cover for imparting rotation from said crank; and
   a removable basket disposed within said container having a bottom provided with a recess for engaging said pivot and a perforated side wall terminating in an upper edge, said upper edge forming a second coupling means for engaging said first coupling means when said cover is placed on said container, said step means providing a hand-hold so that said container may be substantially immobilized during rotation of said crank.

9. An appliance according to claim 8 wherein said crank comprises a knob attached to a disc, said disc being disposed in a depressed circular central zone in said cover and fixed to a central shaft which protrudes upwardly from said cover, said central shaft being connected to said gear means.

10. An appliance according to claim 9 wherein said first coupling means includes a disc having a concave shaped surface defining a concave volume facing said cover, said gear means being substantially enclosed in a casing fixed to said cover, said casing being arranged to at least partially protrude into said concave volume.

11. An appliance according to claim 8 wherein said concave shaped surface further includes an outer periphery having a truncated section for engaging a truncated section disposed on said upper edge when said cover is placed on said container.

* * * * *